United States Patent

Nelson et al.

[11] Patent Number: 5,764,415
[45] Date of Patent: Jun. 9, 1998

[54] COATINGS ON GLASS

[75] Inventors: Douglas M. Nelson, Curtice, Ohio; Timothy Jenkinson, Greater Manchester, United Kingdom

[73] Assignees: Pilkington Glass Limited, St. Helens, United Kingdom; Libbey-Owens-Ford Company, Toledo, Ohio

[21] Appl. No.: 370,418

[22] Filed: Jan. 9, 1995

[30] Foreign Application Priority Data

Jan. 10, 1994 [GB] United Kingdom ............. 9400320

[51] Int. Cl.$^6$ ............ G02B 5/08; C03C 17/00; B05D 5/06
[52] U.S. Cl. ............ 359/584; 359/883; 359/884; 359/900; 65/60.2; 65/60.5; 65/60.8; 65/95; 427/166; 427/167; 427/225.7; 427/419.2
[58] Field of Search ............ 359/584, 585, 359/589, 586, 588, 603, 883, 884, 900; 427/165, 166, 167, 225.7, 419.2, 419.3; 65/60.1, 60.2, 60.5, 60.8, 95

[56] References Cited

U.S. PATENT DOCUMENTS

| | | |
|---|---|---|
| 2,519,722 | 8/1950 | Turner . |
| 4,019,887 | 4/1977 | Kirkbride et al. . |
| 4,188,444 | 2/1980 | Landau . |
| 4,312,570 | 1/1982 | Southwell . |

(List continued on next page.)

FOREIGN PATENT DOCUMENTS

| | | |
|---|---|---|
| 0372405 | 6/1990 | European Pat. Off. . |
| 0372438 | 6/1990 | European Pat. Off. . |
| 0397292 | 11/1990 | European Pat. Off. . |
| 0456488 | 11/1991 | European Pat. Off. . |

(List continued on next page.)

OTHER PUBLICATIONS

J. Stone and L.W. Stulz: Reflectance, transmittance, and loss spectra of multilayer SiSio$_2$ thin film mirrors and antireflection coatins for 1.5μm *Applied Optics*, Feb. 1, 1990, vol. 29, No. 4, pp. 583–588.

Martin et al: Optical Properties of Thin Amorphous Silicon and Amorphous Hydrogenated Silicon Films Produced By Ion Beam Techniques *Electronics And Optics*, Thin Solid Films, 100 (1983), pp. 141–147.

Cartwright et al Abstract: *Multilayer Films of High Reflecting Power*, Physical Review, Col. 55, 1939, p. 1128.

Asahi Glass Co.: Chemical Abstracts, vol. 110, No. 6, Feb. 6, 1989, Columbus, Ohio; Abstract No. 42057, p. 187 (JP 63195149, Aug. 12, 1988).

Asaka Glass Sangyo—(Abstract) Derwent Publications Ltd., AN 88–039167 and JP 62297242, Dec. 24, 1987.

*Primary Examiner*—Ricky D. Shafer
*Attorney, Agent, or Firm*—Howrey & Simon

[57] ABSTRACT

A method of producing front surface mirrors comprising depositing onto a hot ribbon of low transmissivity glass during the production process a low transmissivity reflecting coating whereby the mirrors have a transmissivity through the coated glass of up to about 10% in visible light. There is also provided a front surface mirror comprising a glass substrate of low transmissivity glass carrying a low transmissivity reflecting coating whereby the mirror has a transmissivity through the coated glass of up to about 10% in visible light.

10 Claims, 1 Drawing Sheet

U.S. PATENT DOCUMENTS

| | | |
|---|---|---|
| 4,419,386 | 12/1983 | Gordon . |
| 4,661,381 | 4/1987 | Callies et al. . |
| 4,673,248 | 6/1987 | Taguchi et al. . |
| 4,847,157 | 7/1989 | Goodman et al. . |
| 4,919,778 | 4/1990 | Dietrich et al. . |
| 4,921,331 | 5/1990 | Nakajima ................. 359/884 |
| 4,944,581 | 7/1990 | Ichikawa ................. 359/884 |
| 5,007,710 | 4/1991 | Nakajima et al. ......... 359/589 |
| 5,143,445 | 9/1992 | Bateman et al. . |
| 5,168,003 | 12/1992 | Proscia . |
| 5,179,471 | 1/1993 | Caskey et al. ............ 359/603 |
| 5,216,551 | 6/1993 | Fujii ....................... 359/884 |
| 5,300,174 | 4/1994 | Leach et al. . |
| 5,505,989 | 4/1996 | Jenkinson ................. 427/166 |
| 5,525,406 | 6/1996 | Goodman et al. . |
| 5,576,885 | 11/1996 | Lowe et al. ............... 359/585 |
| 5,580,364 | 12/1996 | Goodman et al. ......... 65/60.2 |

FOREIGN PATENT DOCUMENTS

| | | |
|---|---|---|
| 0482933 | 4/1992 | European Pat. Off. . |
| 0522785 | 1/1993 | European Pat. Off. . |
| 0562660 | 9/1993 | European Pat. Off. . |
| 0583871 | 2/1994 | European Pat. Off. . |
| 2382511 | 9/1978 | France . |
| 2391173 | 12/1978 | France . |
| 1913901 | 4/1970 | Germany . |
| 3928939 | 3/1990 | Germany . |
| 3941859 | 1/1991 | Germany . |
| 63-180902 | 7/1988 | Japan . |
| 01-092700 | 4/1989 | Japan . |
| 977820 | 12/1964 | United Kingdom . |
| 1262163 | 2/1972 | United Kingdom . |
| 1507996 | 4/1978 | United Kingdom . |
| 1507465 | 4/1978 | United Kingdom . |
| 1564618 | 4/1980 | United Kingdom . |
| 2033374 | 5/1980 | United Kingdom . |
| 1573154 | 8/1980 | United Kingdom . |
| 2135697 | 9/1984 | United Kingdom . |
| 2209176 | 5/1989 | United Kingdom . |
| 2229738 | 3/1990 | United Kingdom . |
| 2224366 | 5/1990 | United Kingdom . |
| 2225343 | 5/1990 | United Kingdom . |
| 2227029 | 7/1990 | United Kingdom . |
| 2247691 | 3/1992 | United Kingdom . |
| 2248853 | 4/1992 | United Kingdom . |
| 8701970 | 4/1987 | WIPO . |
| 88/01568 | 3/1988 | WIPO . |
| 91/10563 | 7/1991 | WIPO . |
| 91/14662 | 10/1991 | WIPO . |
| 91/16197 | 10/1991 | WIPO . |

COATINGS ON GLASS

BACKGROUND TO THE INVENTION

The invention relates to a method of producing mirrors, and to coated glass substrates incorporating highly reflecting "mirror" coatings. The present invention has particular application in the manufacture of front surface mirrors which do not require a back obscuring layer.

The light reflecting properties of mirrors are generally provided by a layer of highly relecting metal, especially silver, aluminium or chromium, applied to a glass or plastics substrate; copper layers are sometimes used as an alternative, but are generally less acceptable because of the strong red tint of the reflected light.

Silver coatings are generally applied to preformed glass plates, in the cold, by wet chemical methods in which a solution of silver salt is applied to the glass surface and reacted with a reducing agent which reduces silver ions present to silver metal which deposits on the glass surface. The silver used is not very durable in use and in practice requires protection by other layers, and these methods are generally unsuitable for application to glass on the production line on which it is formed so that a separate "silvering" line is required to produce the silvered glass.

Aluminium coatings are difficult to apply by chemical methods because of the strongly reducing nature of aluminium metal, and aluminium mirrors are generally produced by deposition methods carried out at low pressure e.g. by sputtering. Such low pressure methods are essentially batch processes and, like the wet chemical methods used for deposition of silver mirrors, are generally unsuitable for on-line application on the production line on which the glass is made.

GB 2248853A discloses a method of coating glass with aluminium to form a mirror. A solution of an alane amine adduct of aluminium is formed and the liquid is deposited onto heated glass. The adduct decomposes to form an aluminium coating. Although it is stated that it is envisaged that the invention may be used in conjunction with float glass production, there is no exemplification of such a use. It is believed that substantial technical problems could be encountered in simply introducing the disclosed aluminium compounds into a float glass line.

Silicon layers have also been used to produce reflecting layers (which, like silver and aluminium layers, are substantially neutral in reflection colour) on architectural glazing for aesthetic and solar control purposes. GB 1507465, 1507996 and 1573154 relate to a continuous chemical vapour deposition method for producing float glass having such a silicon layer, and U.S. Pat. No. 4,661,381 describes a development of that method. However, such silicon layers do not provide the high reflections commonly required in mirrors. Thus REFLECTAFLOAT (trade mark) glass, commercially available from Pilkington Glass Limited of St. Helens, England, has a reflection of about 50%, and MIRROPANE EP (trade mark) commercially available from Libbey-Owens-Ford Co. has a reflection of about 60%.

None of the above technology is currently suitable for the application of highly reflecting coatings to glass during the glass production process to provide a coated glass substrate suitable for use as a mirror.

SUMMARY OF THE INVENTION

The present invention provides a method of producing front surface mirrors comprising depositing onto a hot ribbon of low transmissivity glass during the production process a low transmissivity reflecting coating whereby the mirrors have a transmissivity through the coated glass of up to about 10% in visible light.

The present invention also provides a front surface mirror comprising a glass substrate of low transmissivity glass carrying a low transmissivity reflecting coating, the mirror having a transmissivity through the coated glass substrate of up to about 10% in visible light.

The low transmissivity mirrors of the present invention are front surface (Face 1) semi-opaque mirrors which have structural and production advantages compared to known mirrors. The transmissivity of the mirrors is sufficiently low that the mirrors can be used without the requirement for an obscuring layer. In addition the mirrors can employ glass substrates having non-uniform or non-standard tints, which glass would otherwise not be useful. This application can greatly increase the yield of a float glass line making tinted glass by providing a useful outlet for glass produced during a tint change (the expression "tint change" is used to include a change between clear glass and tinted glass as well as changes between different tints).

Preferably, the transmissivity through the coated glass is up to about 5% in visible light, more preferably up to about 2%, still more preferably up to about 1% and yet more preferably up to about 0.5%. Preferably, the transmissivity of the coating in visible light is up to about 15%. Typically, the transmissivity of the coating in visible light is from 1 to 15%, more preferably from 3 to 10%, still more preferably around 5%. The transmissivity of the coating is measured with the same coating applied to clear glass. Preferably, the transmissivity of the glass is up to about 60% in visible light, more preferably up to about 40%, still more preferably up to about 10%.

Preferably, the low transmissivity glass is a tinted glass having an inherently low transmissivity as a result of the glass composition. Preferably, the coating comprises a reflecting layer and at least two reflection enhancing layers whereby the mirror has a visible light reflection from the front surface thereof of at least 70%. The preferred coating of the present invention has a typical absorption of around 15% in visible light.

In this specification the terms "reflecting layer" and "reflection enhancing layer" are intended to indicate the relative interrelationship between the layer positions. Thus, the reflecting layer is, in use, furthest from the source of light to be reflected and the reflection enhancing layers are between the light source and the reflecting layer. The term "reflecting layer" is not necessarily intended to imply that that layer is the primary contributor to the overall reflection of the reflecting coating as compared to the other layers of the coating. In certain embodiments the largest contributor to the overall reflection may be a reflection enhancing layer.

Thus for front surface mirrors the inner of the said three layers is the reflecting layer and intermediate and outer layers act as reflection enhancing layers. The inner layer is identified as the layer of the coating nearest to the glass and the outer layer as the layer furthest from the glass of the said three layers.

It is known in the art that refractive index varies with wavelength. In this specification and claims, references to "refractive index" are intended to mean (in conventional manner) the refractive index for light of wavelength 550 nm and, in assessing and quoting refractive index values, any imaginary part of the refractive index is disregarded.

The expression "visible light reflection", as used in the present specification and claims, refers to the percentage of light reflected under Illuminant D65 source 1931 Observer Conditions.

The reflecting layer may have a high refractive index and the reflection enhancing layers may have high and low refractive indices so that the resultant stack of layers has successive high, low and high refractive indices.

The desired high reflection may be achieved using layer thicknesses such that reflections from the interfaces between the said coating layers reinforce reflections from the outer surface of the said outer layer. The materials of the inner and outer layers are preferably selected so that the aggregate refractive index of the materials of the two layers is at least 5.5 when the reflecting layer is of high refractive index.

In one preferred embodiment, the outer and inner layers each have a refractive index of at least 1.6 and the intermediate layer is of relatively low refractive index, the intermediate layer having a refractive index less than the refractive index of either said inner layer or said outer layer and less than 3, at least one of said inner and outer layers being of silicon, the aggregate refractive index of the inner and outer layers being at least 5.5, and the thicknesses of the layers being such that the mirror has a visible light reflection in the range 70% to 90%.

Silicon is preferably used for at least one of the inner and outer layers because (a) it may have a particularly high refractive index and (b) it is readily deposited on-line on hot glass, for example, by the processes described in GB 1507465, GB 1507996 and GB 1573154.

The refractive index of silicon may be as great as about 5, (see P. J. Martin, R. P. Netherfield, W. G. Sainty and D. R. McKenzie in Thin Solid Films 100 (1983) at pages 141–147) although lower values are often encountered.

It is believed that, in practice, the value varies depending on the precise physical form of the silicon and the presence of any impurities, for example oxygen, nitrogen or carbon. For the purpose of the present invention, the presence of such impurities may be tolerated (and indeed, it is difficult in practice to produce on-line silicon coatings without significant oxygen and/or carbon incorporation) provided the refractive index is not reduced below about 2.8. Thus the term "silicon" as used herein with reference to layers of relatively high refractive index refers to material which is predominantly silicon, but may contain minor proportions of impurities, provided its refractive index is at least 2.8.

While its high refractive index and ease of deposition favour the use of silicon, the high absorption of silicon leads to a reduction in the reflection. When only one of the inner and outer layers is of silicon, the other layer, preferably the outer layer, must be of a material having a higher refractive index than the intermediate layer (and of at least 1.6) and is preferably of low absorption in the visible region of the spectrum. Preferred materials, other than silicon, for a layer of relatively high refractive index are materials having a refractive index in the range 1.9 to 3.0, usually 2.0 to 2.7 and include tantalum oxide, titanium oxide, tin oxide and silicon oxides (including silicon oxides containing additional elements, for example nitrogen and carbon). The amount of such additional elements in silicon oxide can be varied so as to vary the refractive index because the refractive index is composition-dependent. The deposited silicon oxides are generally not stoichiometric. In general, the higher the refractive index of a material, and the lower its visible light absorption, the more effective it will be as a reflecting layer or reflection enhancing layer of high refractive index; expressed in another way, a reduction in the refractive index of the material may be compensated for by a reduction in its visible light absorption. The material used for the reflecting layer is preferably of high refractive index relative to the intermediate layer.

The intermediate layer i.e. the reflection enhancing layer adjacent the reflecting layer, which is of relatively low refractive index, has a refractive index lower (and in any event below 3) than that of the inner and outer layers of relatively high refractive index. In general, the lower the refractive index (for a layer of given light absorption) of the intermediate layer, the higher the reflection that can be achieved. The layer of relatively low refractive index will usually have a refractive index below about 2, and it is generally preferred to use a layer of refractive index less than 1.8.

It is also preferred to use as the intermediate layer a material which is substantially non-absorbing in the visible region of the spectrum in order to increase the total light reflection. A suitable and convenient layer material is silicon oxide, which may however contain additional elements such as carbon or nitrogen, and the term "silicon oxide" is used herein to encompass silicon oxides additionally containing other elements, for example, silicon oxides containing carbon and/or nitrogen and, when used with reference to the intermediate layer, having a refractive index of less than 2. Surprisingly, it is found in practice, that adjacent layers of silicon and silicon oxide can be applied pyrolytically to the glass without interdiffusion or interactions which would cause unacceptable reduction in the refractive index of the silicon or increase in the refractive index of the silicon oxide; the adjacent layers of silicon and silicon oxide appear to remain, at least in terms of their optical performance, separate and distinct. However, it may be that at the interfaces of the layers there exist physically narrow interaction zones with steep refractive index gradients that do not alter the optical characteristics of the mirror. Another material which may be used for the intermediate layer is aluminium oxide.

Some of the coating materials, especially silicon, which may be used to form the outer layer of high refractive index have limited scratch resistance and, if a more durable product is required, an additional protective layer of a harder material, for example of tin oxide, may be deposited over said outer layer. It will be appreciated that, if such a protective layer is used on the front surface mirrors, it should be of a material (and tin oxide and titanium oxide are examples) that has a low light absorption in the visible region of the spectrum in order to maintain the light reflection of the product, and should be of an optical thickness substantially different from a quarter wavelength to avoid suppressing the reflection from the outer layer; if used, such a protective layer will typically have a thickness in the region of 10 nm to 30 nm. An outermost layer, of silicon, titania, tin oxide or the above-described protective layer, provides chemical durability to the mirrors. This is a real technical advantage of the coating enabling it to be used (in contrast to silver) as a front surface mirror.

The thicknesses of the layers may be selected, in generally known manner (see for example the prior art referred to above), so that the reflections from the interfaces between the intermediate layer of relatively low refractive index and the inner and outer layers reinforce reflections from the outer surface of the said outer layer for the front surface mirrors. This will occur for front surface mirrors when the said intermediate and outer layers have an optical thickness of about $n\lambda/4$ wherein $\lambda$ is a wavelength of light in the visible region of the spectrum, i.e. from about 400 nm to 750 nm and n is an odd integer; n may be the same or different for each of the said layers, but is preferably 1 in each case.

It is preferable that, when either (or both) the inner layer or the outer layer is of relatively high refractive index material which is non-absorbing or only weakly absorbing in the visible region of the spectrum, both said inner and said outer layers have a thickness of about $n\lambda/4$, where n and $\lambda$ are as defined above. In this way, reflections from the interface between the inner layer of relatively high refractive index and the glass will reinforce the reflections from the interfaces between the coating layers increasing the overall visible light reflection of the mirrors.

To achieve the desired visible light reflection of 70% the thicknesses of the layers of optical thickness about $n\lambda/4$ may be selected so that the phase differences of the light of a wavelength of about 500 nm reflected towards the light source from the interfaces between the said coating layers and the outer surface of the outer layer are all within ±40% of a wavelength and preferably within ±20% of a wavelength. The general condition is that all the primary reflected rays from the interfaces and said outer face are substantially in phase with a phase error not exceeding those percentage values. Preferably, each of the reflection enhancing layers (being the outer and intermediate layers) will have an optical thickness of 125 nm±25% and the reflecting layer will also have an optical thickness of 125 nm±25%.

The closer the optical thicknesses of the layers are to n.500nm/4 the more neutral the reflection colour will be, while the closer the optical thicknesses of the layers are to n.550nm/4 the higher will be the total light reflection. However, it will readily be appreciated, by those skilled in the art, that the reflection colour can be tuned by varying the optical thicknesses of the layers within the range from about one quarter of 400 nm (blue-green reflection) to one quarter of 750 nm (red-yellow reflection); it will also be appreciated that tuning away from about 550 nm will reduce the total visible light reflection of the product.

According to the preferred method of the invention, the layers of the required index are applied to a ribbon of hot glass during the glass production process. The depositions may be carried out in a known manner by liquid or powder spray processes, or by a chemical vapour deposition process, and each of the layers may be deposited by a different type of process. The depositions may be pyrolytic involving decomposition of a compound which is a pre-cursor for the material of the desired layer, possibly by reaction with another compound.

In general, it is convenient to use a chemical vapour deposition process to apply any silicon or silicon oxide (which may contain carbon) layers that may be required. Thus, for example, any silicon layer may be deposited (directly or indirectly) on the hot substrate by chemical vapour deposition from a silane gas, conveniently in a gaseous diluent, for example nitrogen. It is generally most convenient to use monosilane, although other silanes may also be used, such as dichlorosilane. One suitable process for deposition of such a silicon layer is described in GB 1507996. If desired, for example to improve the akali resistance of the silicon coating, the reactant gas may contain a proportion of a gaseous electron donating compound, especially an ethylenically unsaturated hydrocarbon compound, for example, ethylene, as additive.

A layer of silicon oxide containing carbon for use as a reflecting layer or a reflection enhancing layer of high refractive index but low absorption in the visible may similarly be deposited by chemical vapour deposition from a silane gas, conveniently in a gaseous diluent, in admixture with an ethylenically unsaturated hydrocarbon compound, for example ethylene, using a somewhat higher proportion of ethylene to silane than is required to produce a silicon layer. Again, the silane used is conveniently monosilane.

A silicon oxide layer for use as a reflection enhancing layer of low refractive index (i.e. an intermediate layer) may similarly be deposited by chemical vapour deposition from a silane gas, conveniently in a gaseous diluent, in admixture with oxygen or a source of oxygen. A mixture of a silane and an ethylenically unsaturated hydrocarbon, together with carbon dioxide or an alternative oxygen compound which serves as a source of oxygen such as a ketone, for example acetone, may be used. The relative concentrations of silane and the source of oxygen used will depend on the refractive index required; in general, the lower the refractive index required, the larger the proportion of oxygen-containing compound to silane to be used. Again, the silane used is preferably a monosilane.

For metal oxide layers, such as tin oxide or titanium oxide, either a liquid or powder spray process or a chemical vapour deposition will generally be used. Thus, for example, a layer of tin oxide or titanium oxide may be deposited by chemical vapour deposition by reaction of the corresponding gaseous metal chloride and water vapour, or by spraying a non-aqueous solution of the metal chloride onto the hot glass in the presence of water vapour. Thus tin oxide may be deposited by chemical vapour deposition of components selected from tin tetrachloride and water vapour, and an organo tin compound such as diethyl tin dichloride or tetramethyl tin, and oxygen, the oxygen optionally being present in air. The titanium oxide may be deposited by chemical vapour deposition of a titanium alkoxide, such as titanium isopropoxide, optionally in the presence of water or air.

When applying a coating layer to a ribbon of float glass, the chemical vapour deposition techniques can conveniently be carried out inside the float bath i.e. where the glass is supported on a molten metal bath under a protective atmosphere (but preferably after the glass has finished stretching i.e. at a glass temperature below 750° C.), or after the ribbon has emerged from the float bath. When using a gas containing monosilane to deposit silicon, silicon oxide containing carbon, or other silicon oxide layers, it is preferred to carry out the deposition of that layer in the float bath where the glass is at a temperature in the range 600° C. to 750° C. in order to achieve a satisfactory rate of deposition.

When applying a coating layer to a ribbon of float glass by a liquid or powder spray process, it will generally be more convenient to deposit the layer after the ribbon of glass has emerged from the float bath.

The preferred layers—including silicon, silicon oxide, titanium oxide and (undoped) tin oxide used in the practice of the present invention—while reflecting in the visible region of the spectrum, are substantially transparent in the infra red region so that their presence (unlike that of layers of silver traditionally used for mirrors) on the surface of the glass during annealing will not have any substantial detrimental effect on the annealing of the coated glass. Thus, the coating deposited is substantially transparent in the infra-red region of the spectrum. This means that such mirrors can readily be produced on-line in a float glass process because the mirrors can be annealed in known manner.

The process of the present invention is useful for the production of mirrors for a wide range of applications. One particular application is for use as "one-way" mirrors i.e. mirrors which are high reflecting on one side and low reflecting on the other side. Such mirrors are typically employed in security applications, such as in shops, banks, etc. where it is required to view an area from one side of the mirror without detection from the other side of the mirror.

The use of the present invention to make one-way mirrors has advantages over the known mirrors incorporating metal layers and known one-way mirrors incorporating silicon reflecting layers.

Metal layers of known mirrors have high opacity and thus when they are used in the manufacture of one-way mirrors the reflecting layer is generally discontinuous so that uncoated regions of high transmission are provided between mirror regions coated with the reflecting layer. This can be unaesthetic. In addition, the high transmission regions permit a person to look through the mirror from the mirrored side thus reducing the one-way nature of the mirror. If silicon layers alone are used to produce a one way mirror, because of the high transmission characteristics of the mirror, on the non-reflecting side of the mirror it is necessary to have low intensity lighting conditions if objects on the non-reflecting side are to be indistinguishable from the reflecting side. A known one-way mirror incorporating the MIRROPANE coating on a tinted glass has a total transmissivity of 10 to 20%, a transmissivity of the coating of around 20 to 30% and a transmissivity of the glass of about 50% for a 6 mm thick pane, all in visible light.

When the present invention is employed to make front surface one-way mirrors, the reflection on the uncoated side (i.e. the back surface) is preferably less than 20% in visible light, more preferably less that 10% and the reflection on the front surface is preferably greater than 70% in visible light. The one-way mirrors employed in the present invention could typically be utilised in lighting conditions having a light intensity ratio between the reflecting and non-reflecting sides of 5:1. This may compare to a ratio of 10:1 required for the known MIRROPANE one-way mirrors.

The ability to produce front surface glass mirrors on-line at high yield, using coating steps based on known technology, for example the pyrolytic deposition of a silicon layer, is an important step forward.

The materials, properties and thicknesses of the coating layers, and any additional outer protective layer more durable than and applied over said outer layer, may be selected as discussed above with reference to the method of the invention.

The skilled man will also appreciate that additional low and high refractive index quarter wave (nλ/4 where n is an odd integer, preferably 1) layers may be added to the stack of layers to further enhance the reflection.

It may also be possible to incorporate additional non-quarter wave layers between the said inner and outer layers, although in that event such layers are generally best regarded as forming part of a composite intermediate layer which should, considered as a composite single layer, have a thickness such that the phase differences of the light reflected towards the light source from the interfaces of said composite intermediate layer and the other coating layers and the outer surface of the outer layer are all within ±40% of a wavelength, and preferably within ±20% of a wavelength. Thus the composite single layer will have a refractive index less than the refractive index of either said inner layer or said outer layer and less than 3; preferably such composite single layer will have a refractive index of less than 1.8 and an optical thickness of 125 nm±25%. Similarly, an additional layer may be included between the inner layer and the glass.

BRIEF DESCRIPTION OF THE DRAWINGS

The invention is illustrated but not limited by the following drawings and Example. In the drawings.

DETAILED DESCRIPTION OF THE PREFERRED EMBODIMENTS

Figure 1:
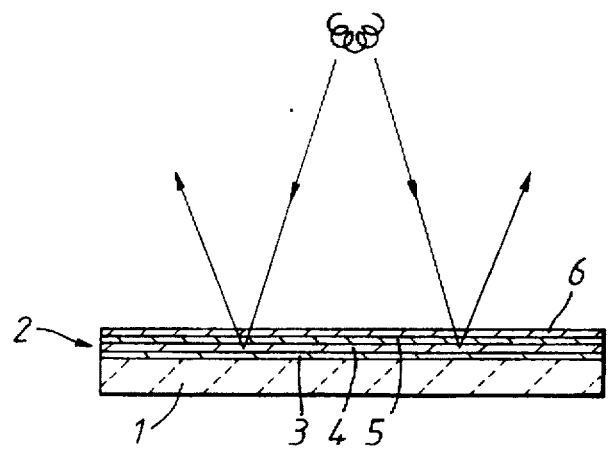
FIG. 1 is a section (not to scale) through a mirror in accordance with the invention in use as a front surface mirror.

Referring to FIG. 1, a front surface glass mirror comprises a float glass substrate 1, composed of low transmitting glass, carrying a coating 2 comprising an inner layer 3 of relatively high refractive index, for example of pyrolytic silicon, and intermediate layer 4 of relatively low refractive index, for example of silicon oxide having a refractive index below 1.8 and containing silicon and oxygen in atomic proportions of about 1:2, and an outer layer 5 of relatively high refractive index, for example of pyrolytic silicon. If only one of the layers 3 and 5 of relatively high refractive index is of silicon, it will usually be the inner layer, with a material having a lower absorption for visible light, for example silicon oxide containing carbon, tin oxide or titanium oxide, being used as the outer layer 5. Each of the intermediate layer 4 and the outer layer 5 has an optical thickness of nλ/4, wherein n is an odd integer (preferably 1) and is a wavelength of light in the visible region of the spectrum i.e. from about 400 nm to 750 nm. If the inner and outer layers 3 and 5 are of an absorbing material such as silicon, the thickness of the inner layer is less critical, but it may also correspond to an optical thickness of nλ/4 wherein n and λ are as defined above and n is an odd integer preferably 1.

A protective layer 6 more durable than outer layer 5 is applied over layer 5. The protective layer may be of tin oxide, and may be applied by chemical vapour deposition. When the outer layer 5 is of silicon, such a protective layer of tin oxide should be applied only after a surface layer of silicon oxide has been formed on the silicon, for example, as described in U.S. Pat. No. 4,661,381.

The use of titanium oxide as or outer layers instead of silicon has been found to increase the reflectivity of the mirror products. For example, the use of titanium dioxide as the outer layer can increase the reflectivity, as compared to a mirror having a silicon outer layer, by about 5%.

The glass substrate is composed of a dark, grey tinted low transmission glass. A typical glass is sold by the company Libby Owens-Ford of Toledo, Ohio, USA under the trade name GALAXSEE. A 6 mm pane of that glass has a transmissivity in visible light of around 8%. In the front surface mirror construction of the present invention, the use of the mirror forming layers reduces the transmissivity of the mirror including a 6 mm pane of that glass to around 0.3% in visible light. For 2 mm, 3 mm and 4 mm thick panes of that glass, the total tranmission through the glass and coating is around 1.2%, 0.8% and 0.5% respectively. The use of a low transmissivity glass substrate in the mirrors of the present invention enables the production of a mirror structure which has inherent obscuration so that for a number of different applications the mirror can be regarded as inherently sufficiently opacified to be utilised without the requirement for an additional obscuring layer applied to the glass substrate. Thus, for applications where the back surface of the mirror is arranged to be mounted against a relatively dark background, the transmissivity is sufficiently low for the mirror to appear to the user to be substantially opaque. The use of non-metallic reflecting layers in the mirror construction of the present invention obviates the requirement for any chemical protection of the layers which is required for example in the known silvered mirrors wherein a pair of paint layers is applied to the back copper-coated surface of the silvered mirror in order chemically to protect the metallic layers from corrosion. Thus the present invention can produce a front surface mirror structure having a simple, readily manufacturable structure which can be fabricated entirely on a float glass line during the glass manufacturing process without any subsequent opacification step being required.

The preferred mirror of the present invention can use a tinted float glass substrate, enabling the production yield of a float glass plant producing tinted glass greatly to be improved. When a float glass plant is employed to produce tinted glass, if the float glass plant had previously being employed to produce untinted glass then the tinting components are added to the batch material and it takes some time, for example, up to about a week, in order for the tint to build up sufficiently in the resultant glass ribbon to the desired tinting level. In the build-up period, the glass often is not usable because either the tint is not at a sufficiently high level or the tint is non uniform. This also applies when the float glass plant is run down from producing tinted glass in order to produce an untinted glass, or when changing the tint. The method of the present invention can greatly increase the yield of such a float glass plant because it enables the use in commercial products of float glass having non uniform tints. The reflecting layer can be deposited on glass having a non-standard tint or during a tint change. This is because, even if the tint is non uniform but has sufficiently low transmission characteristic to be employed in the present invention, the coated substrate can still be employed in a mirror. For tinted products having a relatively high transmission, this product can still be used, although not in accordance with the present invention, by being coated with an obscuring layer.

In addition, the present invention has particular application in the manufacture of one-way mirrors. Such one-way mirrors have a reflection on the front reflecting side of preferably greater than 70% in visible light and the reflection on the rear glass side of preferably less than 20%, more preferably less than 10% in visible light. The use of a low transmitting coating on a low transmitting glass substrate in accordance with the present invention provides a relationship between the transmission and the reflection characteristics on the two sides whereby the mirror can be used as a one-way mirror. Thus a person looking through the one way mirror on the non-reflecting side can have sufficient visibility through the mirror, in the absence of a reflecting image, to be able to discern objects on the other side of the mirror whereas a person looking at the reflecting side of the mirror sees a surface which is highly reflecting (greater than 70% reflectivity) so that the person sees only a reflected image and cannot discern objects on the other side of the mirror.

The one-way mirror made in accordance with the invention using a highly reflective but non-opaque low transmissivity mirror coating on a low transmissivity glass substrate provides the advantage that the mirror requires less stringent lighting conditions i.e. less of a light intensity differential on the two sides of the mirror (relatively light on the reflecting side and relatively dark on the non-reflecting side), typically 5:1, than compared to the prior art one way mirrors, especially using the prior MIRROPANE coating where the light differential is typically 10:1, in order for a person on the non-reflecting side not to be visible to a person on the reflecting side.

Figure 2:
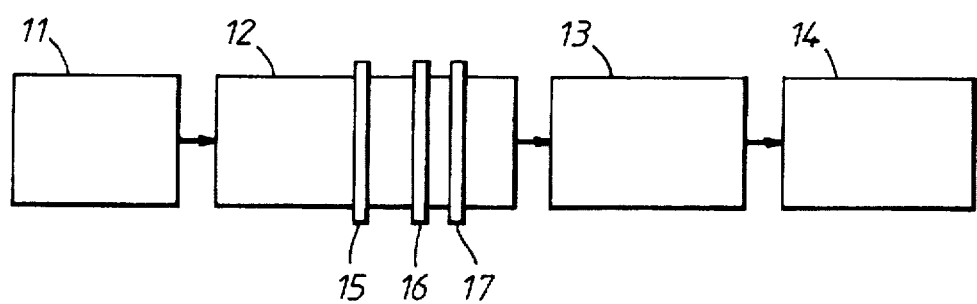
FIG. 2 is a diagrammatic representation of the arrangement of coating stations on a float glass production line for production of mirrors in accordance with the method of the present invention.

FIG. 2 illustrates, diagrammatically, a float glass production line comprising a glass melting section 11, a float bath section 12 for forming the molten glass into a continuous ribbon of low transmissivity, a lehr section 13 for annealing the said glass ribbon and a warehouse section 14 for cutting pieces of glass from the ribbon for storage and/or distribution and use. For the production of mirrors in accordance with the method of the invention, each of the three coating stations for respectively applying the inner, intermediate and outer layers will normally be located in or between the float bath section 12 and lehr section 13; in the illustrated embodiment of the inventions, the said three coating stations 15,16,17 are arranged in the float bath section 12 as shown in FIG. 2. However, in alternative embodiments, one or each of the coating stations for applying inner, intermediate and outer layers in accordance with the invention may be located between the float bath section 12 and the lehr section 13. The location of each coating station is selected to be at a position where the glass ribbon has substantially reached its final thickness (usually at a glass temperature of around 750° C.) so that it is not subject to further stretching which might crack any coating applied, but where its temperature remains sufficiently high for formation of a further pyrolytic layer (usually a glass temperature of at least 300° C.).

The following Example illustrates the present invention without limiting it, and in the Example front surface mirrors were produced on-line using a float glass production line having the structure shown in FIG. 2.

EXAMPLE 1

Glass mirrors, intended for use as front surface mirrors, were produced using the laminar vapour coating process and apparatus described in GB 1507996 incorporating the modification described in GB 2209176A. Three separate coating beams, each as described in said patent specifications, were used to apply successive silicon, silicon oxide and silicon layers to a ribbon of float glass having a thickness and advancing at a lehr speed shown in Table 1. Each of the three coating beams was located in the float bath where the glass ribbon was supported on a bath of molten metal. The upstream, intermediate and downstream (each with reference to the direction of glass advance) beams were each respectively located at positions where the glass temperature was approximately as specified in Table 1.

The upstream and downstream beams each had a coating chamber with a length of approximately 13 cm in the direction of glass advance; the intermediate beam had a coating chamber with a length of approximately 26 cm in the direction of glass advance.

The upstream, intermediate and downstream beams were each fed with the respective gas mixtures specified in Table 1. Nitrogen ($N_2$) was used as carrier gas. In this Example the gas flows were all measured at ambient temperature and pressure 0.7 bar, except for flows of nitrogen which were measured at ambient temperature and 1 bar pressure, and acetone which is measured as a liquid, and all are quoted per meter width of glass coated.

No modification of the lehr conditions was required to anneal the resulting coated ribbon which had a highly reflecting appearance on the front surface, the reflection being slightly yellow in colour. The colour can be quantified by the use of a colour coordinate system which is well known to the person skilled in the art, wherein colour is represented by two coordinates a* and b* in an orthogonal coordinate system wherein negative a* is green, negative b* is blue, positive a* is red and positive b* is yellow. Examination of sample mirrors cut from the ribbon showed them to have a high visible light reflection from the front face (Face 1), a low transmissivity and colour coordinates as specified in Table 1. In the Example the reflection and the colour coordinates were measured using Illuminant D65 source 1931 Observer conditions.

EXAMPLE 2

The method of the invention was used generally as described in Example 1 to apply successive silicon, silicon oxide and silicon layers to a ribbon of float glass under the conditions specified in Table 2. The optical properties of the resultant mirrors are also shown in Table 2. The ribbon composed a non-uniformly tinted glass, the float glass plant being run during a tint change. The bands of different colour tints present in the ribbon of glass could not be seen through the coating in the resultant mirrors.

The preferred embodiments of the process and product of the present invention have important advantages over the prior art. The process enables glass mirrors to be produced "on line" in a single manufacturing process starting with the batch which is melted to produce the molten glass, which is formed into a continuous ribbon, coated, annealed and cut to size for subsequent storage and for distribution.

reflecting coating with a transmission of 1 to 15% in visible light whereby the mirrors have a transmissivity through the coated glass of up to about 10% in visible light.

2. A method according to claim 1 wherein the mirrors are for use as one way mirrors and have a reflection on the back face thereof of less than around 20% in visible light.

3. A method according to claim 1 wherein the reflecting coating comprises a reflecting layer and at least two reflection enhancing layers.

4. A method according to claim 3 wherein the reflection enhancing layers comprise an intermediate layer of the coating of relatively low refractive index and a layer adjacent to the intermediate layer of relatively high refractive index.

5. A method according to claim 4 wherein the reflecting layer comprises a layer adjacent to the intermediate layer of relatively high refractive index.

6. A method according to claim 5 wherein at least one of the relatively high refractive index layers is of silicon.

7. A method according to claim 6 wherein both of the relatively high refractive index layers are of silicon.

8. A method according to claim 6 wherein the other of the said layers of relatively high refractive index is of tin oxide, titanium oxide or a silicon oxide.

9. A method according to claim 4 wherein the layer of relatively low refractive index comprises a layer of silicon oxide.

TABLE 1

| Coating Conditions | Line Speed | | | | 450 m/hour | | | |
|---|---|---|---|---|---|---|---|---|
| | Upstream Beam | | | Intermediate Beam | | | Downstream Beam | |
| Glass substrate | Temp.-°C. | Gas Flows | l/min | Temp.-°C. | Gas Flows | l/min | Temp.-°C. | Gas Flows | l/min |
| 6 mm Thick grey tinted glass Uncoated transmission 8% | 700 | $SiH_4$ $N_2$ | 4 30 | 670 | $SiH_4$ $C_2H_4$ Acetone $N_2$ | 4.2 1.2 0.008 30 | 650 | $SiH_4$ $N_2$ | 3.9 28.6 |

Optical Results

Reflectivity (Face 1) 80%
Reflectivity (Face 2) 6%
Transmissivity (Face 2) 0.35%
Colour co-ordinates (Face 1) a* = −2.0 b* = +9.7

TABLE 2

| Coating Conditions | Line Speed | | | | 450 m/hour | | | |
|---|---|---|---|---|---|---|---|---|
| | Upstream Beam | | | Intermediate Beam | | | Downstream Beam | |
| Glass substrate | Temp.-°C. | Gas Flows | l/min | Temp.-°C. | Gas Flows | l/min | Temp.-°C. | Gas Flows | l/min |
| 6 mm non-uniformly tinted glass | 700 | $SiH_4$ $N_2$ | 3 30 | 650 | $SiH_4$ $C_2H_4$ Acetone $N_2$ | 4.5 1.0 0.010 30 | 645 | $SiH_4$ $N_2$ | 4.1 30 |

Optical Results

Reflectivity (Face 1) 77%
Colour co-ordinates (Face 1) a* = −2.7 b* = +7.5

What is claimed is:

1. A method of producing front surface mirrors having a front surface visible light reflection of at least 70% comprising producing a hot ribbon of glass having a transmissivity of up to 60% in visible light and depositing onto the hot ribbon of glass during the glass production process a 10. A method according to claim 1 wherein the reflecting coating is deposited onto the hot ribbon of glass during a tint change in the glass production process.

* * * * *